(12) United States Patent
Holler et al.

(10) Patent No.: US 12,431,831 B2
(45) Date of Patent: Sep. 30, 2025

(54) METHOD FOR OPERATING AN ELECTRIC DRIVE SYSTEM HAVING A PLURALITY OF ENERGY STORAGE MEANS

(71) Applicant: Dr. Ing. h.c. F. Porsche Aktiengesellschaft, Stuttgart (DE)

(72) Inventors: Christian Holler, Leonberg (DE); Robert Nelles, Stuttgart (DE); Thomas Hubert, Leonberg (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 68 days.

(21) Appl. No.: 18/137,587

(22) Filed: Apr. 21, 2023

(65) Prior Publication Data
US 2023/0370009 A1 Nov. 16, 2023

(30) Foreign Application Priority Data
May 12, 2022 (DE) ............ 10 2022 111 881.9

(51) Int. Cl.
*H02P 27/06* (2006.01)
*B60L 50/51* (2019.01)
*B60L 58/18* (2019.01)
*H02P 21/22* (2016.01)
*H02P 25/22* (2006.01)

(52) U.S. Cl.
CPC ............ *H02P 27/06* (2013.01); *H02P 25/22* (2013.01); *B60L 50/51* (2019.02); *B60L 2220/58* (2013.01)

(58) Field of Classification Search
CPC ......... H02P 25/22; H02P 27/06; H02P 21/22; B60L 2220/58; B60L 50/51; B60L 58/18
See application file for complete search history.

(56) References Cited

U.S. PATENT DOCUMENTS

| | | | |
|---|---|---|---|
| 7,956,563 B2 * | 6/2011 | Perisic | B60L 58/40 318/400.41 |
| 9,350,287 B2 * | 5/2016 | Gorka | H02M 3/156 |
| 10,063,180 B2 * | 8/2018 | Wang | B60L 15/007 |
| 2009/0033274 A1 * | 2/2009 | Perisic | B60L 50/51 318/440 |

(Continued)

FOREIGN PATENT DOCUMENTS

| | | |
|---|---|---|
| JP | 2016-220392 | 12/2016 |
| JP | 2020-022302 | 2/2020 |
| WO | 2018/020657 | 2/2018 |

*Primary Examiner* — Thai T Dinh
(74) *Attorney, Agent, or Firm* — Gerald E. Hespos; Michael J Porco

(57) ABSTRACT

A method is provided for operating an electric drive system (20) with an electric machine (27) that comprises a first multiphase winding operatively coupled to a first inverter (25), and has at least one second multiphase winding that is coupled to a second inverter (26), A first energy storage (23) is arranged upstream of the first inverter (25), and a second energy storage (24) is arranged upstream of the second inverter (26). The method includes: operating the electric machine (27) by providing a first power flow between the first energy storage (23) and the first multiphase winding; and energizing the second inverter (26) so that a second power flow can be provided between the first energy storage (24) and the second multiphase winding. An electric drive system also is provided for carrying out the method.

7 Claims, 1 Drawing Sheet

(56) References Cited

U.S. PATENT DOCUMENTS

| | | | |
|---|---|---|---|
| 2015/0314694 A1* | 11/2015 | Alakula | B60L 53/14 |
| | | | 320/109 |
| 2019/0299808 A1 | 10/2019 | Oyama | |
| 2020/0195100 A1* | 6/2020 | Omata | H02P 27/06 |
| 2021/0111659 A1* | 4/2021 | Akutsu | B62D 5/0403 |
| 2021/0351684 A1 | 11/2021 | Nishimura | |
| 2023/0012569 A1* | 1/2023 | Spitzer | B64C 11/44 |
| 2023/0079985 A1 | 3/2023 | Suzuki | |

* cited by examiner

METHOD FOR OPERATING AN ELECTRIC DRIVE SYSTEM HAVING A PLURALITY OF ENERGY STORAGE MEANS

CROSS REFERENCE TO RELATED APPLICATION

This application claims priority on German Patent Application No 10 2022 111 881.9 filed May 12, 2022, the entire disclosure of which is incorporated herein by reference.

BACKGROUND

Field of the Invention

The invention relates to a method of operating an electric drive system having a plurality of storage means. For example, the method can be used in electric vehicles. The invention also relates to a drive system having a control circuit configured to regulate operation of the drive system.

Related Art

Electromobility is gaining in importance, and thus corresponding vehicles are gaining market share. Electric motors of traction drives typically are formed in three phases with a distributed or concentrated winding, a diameter winding, or a winding as desired. The electric motor is powered by a traction battery, and voltage source inverters (VSI) typically are used to convert the voltage and drive the electric motor. To this end, a clocked voltage signal is provided on the outputs of the inverter, and results in an approximately sinusoidal current flow due to the large inductances of the electric motor. Clocked inverters operate according to the principle of pulse width modulation (PWM) or pulse amplitude modulation (PAM). Pulse width modulation (PWM) is found more frequently in electric drives.

Electric vehicles are becoming increasingly popular given the fact that their dynamics often exceed those of vehicles equipped with internal combustion engines. The electric drive is responsible for this result, and basically allows an immediate acceleration over nearly the entire speed range, even in non-rugged electric vehicles. Thus, electric drive enables the agile driving performance normally found only in sports cars with significantly stronger internal combustion engines.

To achieve high torque levels in the electric motor, the current supplied by the inverter to the winding of the electric motor necessarily increases. Thus, the construction and cooling of the inverter become more and more expensive. To counteract these disadvantageous effects, attempts have been made to reduce the inverter current (DC and AC currents) while increasing the DC voltage applied to the inverter. Conventionally, the voltage of the battery is increased for this purpose by having more battery packs or battery cells in series. However, the likelihood of battery packs failing increases with the number of battery cells arranged therein, since the weakest cell in the pack limits the power output of the entire pack.

Furthermore, increasing the battery voltage will result in increased voltage loading at various states of charge (SoC) and will result in oversizing of the inverter and the electric machine.

In light of this, an object of the invention is to provide a means of operating an electric motor or corresponding electric drive system securely and reliably in high load ranges.

SUMMARY OF THE INVENTION

Various embodiments provide a method for operating an electric drive system. A driving system according to the invention comprises an electric machine (electric motor) with a first multiphase winding operatively coupled to a first inverter and at least one second multiphase winding coupled to a second inverter. The term "operatively coupled" means that output terminals of an inverter are electrically coupled to phase terminals of an associated winding such that proper operation of the electric machine can be provided by operation of the inverter. The inverters can be conventional inverters known from the prior art, and may comprise plural half bridges with at least two power semiconductor switches per half bridge with an average phase tap. The number of half bridges corresponds to the number of phases of the winding and can be three.

The electric drive system further comprises a first energy storage means upstream of the first inverter and at least one second energy storage means upstream of the second inverter. Stated differently, the live outputs of each energy storage means are coupled to the input terminals of the respective inverter, so that each inverter can perform a voltage conversion of the voltage supplied to that inverter. In addition, an intermediate circuit can be arranged between each power storage and inverter pair. The intermediate circuit can comprise a capacitor. The energy storage means can be traction batteries, each of which has plural battery modules, each of which in turn comprises plural battery cells. The first energy storage means can be a high energy battery, and the second energy storage means can be a high-power battery. In a further embodiment, the second energy storage means can comprise a fuel cell connected to a capacitor, and high power outputs can be drawn from the fuel cell by the electric machine as necessary.

The two energy storage means can have generally different properties and voltages. A large spread of battery properties can be advantageous, as the advantages of each of the two technologies can be harnessed. At the same time, the disadvantages of the other technology can be balanced and, as a result, not adversely affect the operation of the electric powertrain. In other words, the one battery technology optimally covers at least some of the drawbacks of other battery technology. A large spread also can be reflected in the manner in which the two batteries are connected.

At this point, it should be emphasized that both the first and second elements—i.e., the first energy storage means, the first inverter and the first winding—provide a powertrain that is electrically isolated from the other powertrain (but not necessarily electromagnetically). The term "powertrain" in this context designates the electric powertrain used to drive the electric machine. The first powertrain can be operated entirely independently of the second powertrain.

The method disclosed herein comprises two different phases of operation of the electric machine within the electric drive. In a first mode, which can be referred to as a basic mode or a control mode of operation, the method comprises operating the electric machine by providing a first power flow between the first energy storage means and the first multiphase winding. In this case, only the first powertrain is active, while the second powertrain (comprising the second energy storage means, the second inverter, and the second winding) is inactive. This basic mode can correspond to a mode in which the electric machine can provide power, or in which power is called for from the electric machine below a power threshold value. This can mean that the power to be provided or accessed can be provided while maintaining the limits for operating parameters on the electrical and/or electronic components involved in the power/voltage supply and/or conversion within the first powertrain. Stated differently, the power threshold can be determined based on a maximum current flow and/or a maximum voltage and/or frequency within the first powertrain. The power threshold also can correspond to an arbitrary value that ensures the first powertrain as a whole is not overloaded and operates at, e.g., 5% or 10% or more below its nominal load threshold.

The basic mode generally can be an operation mode of the electric drive system in which no peak powers are to be provided or accessed by the electric drive system. For example, current and/or voltage values, or values derived therefrom, can be used at predetermined points within the first powertrain to determine the ratio between the power provided and/or retrieved and the electric machine, e.g., the power flow through the first inverter. Further, in the base mode, the electric machine can be substantially in motor operation.

In a second mode, the method comprises switching on/activating the second inverter so that a second power flow between the second energy storage means and the second multiphase winding can be provided. Energizing the second energy storage means can occur temporarily, i.e., for a limited period of time, and can be determined by certain operating situations of the electric machine, and those operating situations can be determined by certain driving conditions of the associated electric vehicle (e.g., strong acceleration, braking). During acceleration (e.g., torque request), energy can be drawn from both energy storage means, e.g., when the launch control is activated. Depending on the operating state of the electric machine, the second power flow can be from the second energy storage means to the electric machine (motor operation of the electric machine from the perspective of the second powertrain), or vice versa (generator-based operation of the electric machine). Motor operation of the electric machine in the second mode can be referred to as a high-power mode, since in this case the electric machine is operated via power flow from the two energy storage means. Regenerative operation of the electric machine is understood to mean a recuperation operation in which the overall system, e.g. an electric vehicle, is decelerated recuperatively and the direction of power flow reverses. Furthermore, the second mode also can be activated when operating the vehicle at an increased load, e.g., when the electric vehicle is operating with a trailer.

Each of the two multiphase windings can be adapted to or optimally designed for the associated energy storage means, in particular to its voltage capability. By optimally designing the winding of the electric motor, the voltage of the respective energy storage means can be exploited in an optimal manner. There are many ways of accomplishing this. For example, the winding of the second energy storage means, in particular if it is designed as a high-performance storage means, can have a thicker conductor cross section and/or can have a stronger insulation to enable a higher power flow to the electric motor. Further, the two windings can have different numbers of coils, and their interaction with regard to the respective voltage capabilities or power flows from the energy storage means is adjusted. Further, regulation of the two powertrains can also be different. For example, regulation of the second powertrain can be optimized for high power flows and can have block operation or over-modulation.

According to further embodiments, the second power flow from the second energy storage means to the second multiphase winding can occur during operation of the electric machine only based on exceeding a load threshold for the first power flow across the first inverter. Upon energizing the second inverter, the second powertrain is activated and assists in torque formation in the electric machine. Stated differently, in the second mode, the electric machine—given the presence of two three-phase windings—is operated as a 2×3-phase electric machine, and the separate windings are powered by the two separate three-phase inverters. In general, therefore, the power flow via the second inverter is used only at high loads, when the power flow through the first inverter is being used over the entire load collective, i.e., generally when the electric powertrain is operating and regardless of the respective operating mode.

Incorporating the second energy storage means into the operation of the electric powertrain in high power motor phases increases the degrees of freedom and optimizes potential increases as compared to a single energy storage means designed for equal power outputs. Furthermore, the peak power output at a low charge level (SoC) of the first energy storage means can be optimized to reduce an undesirable voltage drop on the first energy storage means. Furthermore, higher power output or demand can be achieved in the short term by means of the second energy storage means without overloading the first powertrain.

In some embodiments of the method, the second power flow can occur from the second multiphase winding into the second energy storage means, thereby charging said second power flow. In this embodiment, an energy exchange takes place between the first and second energy storage means by coupling these two by way of the electric machine. Further, the neutral points of the two multiphase windings are not coupled to one another. Inductively transferring energy from one energy storage means to the other via the electric motor can have the greatest possible coupling of the two multiphase windings in the electric machine. To this end, each of the multiphase windings can be present throughout the stator, and the windings of the two multiphase windings in the grooves of the stator can each be arranged together, e.g., around one another. In other words, a transformer principle is implemented in the electric motor, wherein the multiphase winding associated with the first energy storage means corresponds to the first transformer side, and the multiphase winding associated with the second energy storage means corresponds to the second transformer side. Each winding can cover the entire phase space, so that the individual phases of each of the multiphase windings are shifted by 120° relative to each other.

According to further embodiments, the second energy storage means can be charged if it is not fully charged and: i) the power required to operate the electric machine is below a second load threshold; or ii) the electric machine is in generator operation.

Case i) corresponds to an operating scenario in which the power retrieved by the electric machine is significantly below the power available from the first powertrain. In this context, the operation mode can correspond to the basic mode, and the second energy storage means is charged by the power flow from the first energy storage means in addition to the operation of the electric machine. For example, the second load threshold can be 50% of the aforementioned power threshold.

Case ii) corresponds to an operating scenario in which braking energy (recuperative braking) is recovered. This reclaimed energy can then be used primarily to charge the second energy storage means.

The operating behavior of the second energy storage means can be due to additional factors. The additional factors can be information about the steering angle of the vehicle and/or the ABS system. Thus, the second energy storage means can be charged when not fully charged, and when corresponding predefined travel situations are detected. In other words, the steering angle signal, the ABS system and/or other things can be the trigger for charging the second energy storage means. For example, charging the second energy storage means can be initiated during curved travel and/or during an adequately strong braking maneuver. Further travel data can be used to estimate the travel situation, e.g., the average speed in a last predefined interval, frequency and/or intensity of the most recent acceleration events, roadway conditions (e.g., temperature, moisture, etc.). Based on these data, it can be detected with better accuracy if the driver wants to accelerate the electric vehicle greatly to be able to provide a power boost by means of the second energy storage means.

According to further embodiments, the method can comprise disabling the second inverter so that the current path carrying the second power flow is deactivated when the total power flow across the inverters falls below the load threshold during operation of the electric machine. Thus, the second inverter or the second powertrain as a whole can be switched on as needed during operating phases with high loads.

In some embodiments, disabling the second inverter can comprise long-term opening of current-conducting elements (e.g., switches) or current-conducting paths in the second inverter. In this context, "long-term opening" is understood to mean any opening that lasts more than a factor of magnitude longer than the usual short-term opening operations of the load switches in the inverter during normal cycled operation.

According to further embodiments, each of the multiphase windings can be three-phase. Thus, each inverter can comprise three phase outputs, and the electric machine can be configured as a 2×3 phase machine.

In further embodiments, the load threshold can apply primarily to motor operation of the electric machine. If, in the case of recuperative braking operations, the power flow generated by the electric machine can be expected to increase into or even beyond the range of the load threshold, the load threshold can also apply to generator operation of the electric machine. A generator load threshold can be used to implement a powertrain protection function. For example, when a heavy braking maneuver under ABS and ESP use of the electric motor generates high power, it can be received from both energy storage means.

The load threshold during generator operation of the electric machine can be different from the load threshold during motor operation of the electric machine.

In some embodiments, the first energy storage means can have a different circuitry of the energy storage cells arranged therein than the second energy storage means. The second energy storage means can be designed as a high-performance storage means to deliver and receive very high power. In this context, the battery cells within the two energy storage means can differ, e.g., in terms of their cell chemistry or the technology principle used (e.g., capacitor and battery cell).

According to further embodiments, and in addition to the previous embodiment, the first energy storage means can comprise energy cells designed as high-energy cells in terms of their cell chemistry, i.e., they are designed for particularly high energy densities. The second energy storage means can comprise energy cells designed as high-performance cells in terms of their cell chemistry, i.e., they are designed for particularly large power flows.

By means of different interconnection of the cells within the two energy stores and/or by different cell chemistry of the cells in the two energy stores, they can differ in terms of their power output and/or maximum voltage capability.

Further embodiments provide an electric drive system comprising an electric machine comprising both a first multiphase winding operatively coupled to a first inverter and at least one second multiphase winding coupled to a second inverter. The drive system further comprises a first energy storage means arranged upstream of the first inverter; a second energy storage means arranged upstream of the second inverter; and a control circuit coupled to regulate terminals of the two inverters and configured to regulate operation of the electric machine according to the method for operating an electric drive system described herein.

It is understood that the aforementioned features and the features yet to be explained in the following can be used in the respectively specified combination and in other combinations or on their own without departing from the scope of the invention.

Additional advantages and configurations of the invention follow from the description and the enclosed drawings.

DETAILED DESCRIPTION

Figure 1:
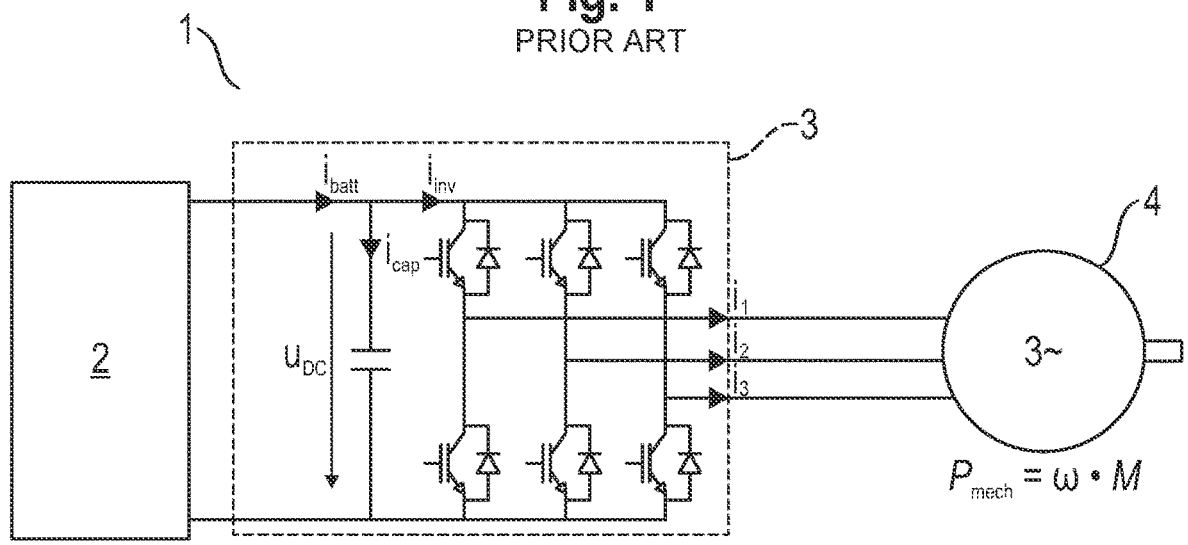
FIG. 1 shows an electric drive system according to the prior art.
Figure 2:
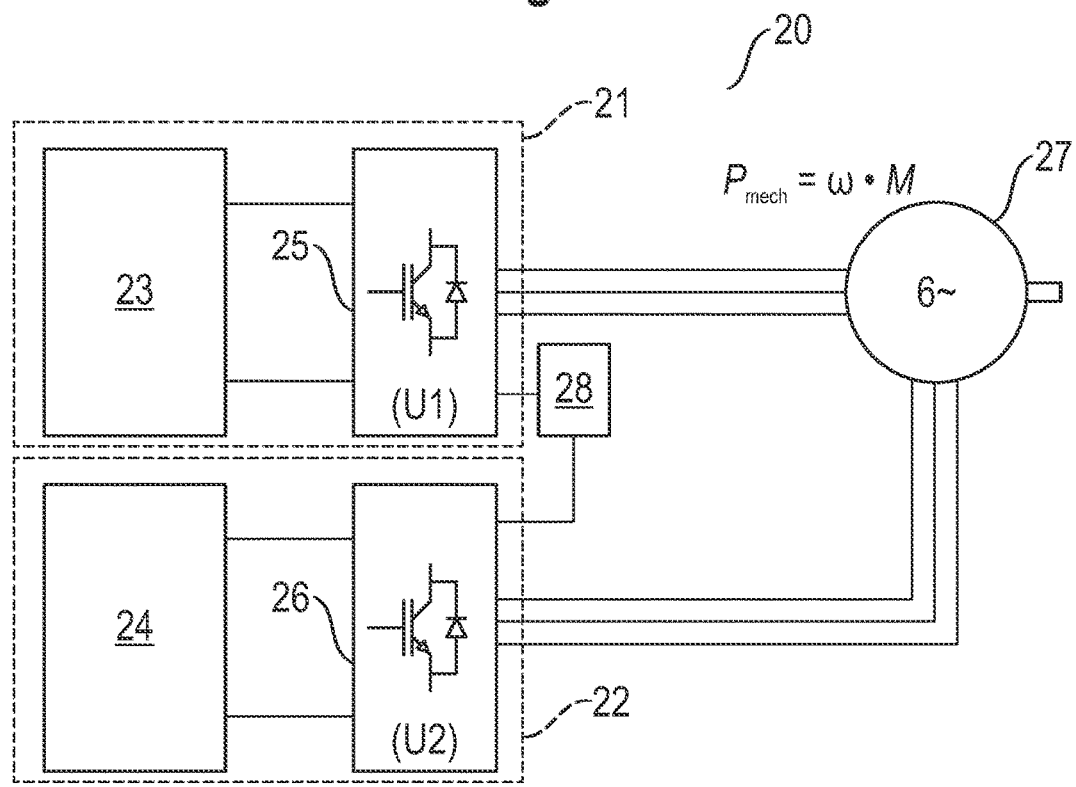
FIG. 2 shows an electric drive system based on the method of the invention.

At the outset, it should be understood that the elements and functions described herein and shown in FIGS. 1 and 2 may be implemented in various forms of hardware, software or combinations thereof. These elements may be implemented in a combination of hardware and software on one or more appropriately programmed general-purpose devices, which may include a processor, memory and input/output interfaces. The term "coupled" as used or implied herein mean directly connected to or indirectly connected with through one or more intermediate components. Such intermediate components may include both hardware and software-based components.

Those skilled in the art will appreciate that the Figures represent conceptual views of illustrative circuitry embodying the principles of the disclosure and/or also represent various processes that may be represented substantially in computer readable media and so executed by a computer or processor, whether or not such computer or processor is explicitly shown.

FIG. 1 shows electric drive system 1 that has an energy storage means 2 in the form of a traction battery that is coupled to an inverter 3 via an DC link (the DC link capacitor is graphically assigned to the inverter). The outputs of the typically three-phase inverter 3 are coupled to corresponding phase inputs of a winding of the electric machine. The operation of the electrical system outlined in FIG. 1 is known from the prior art and will not be explained in further detail.

FIG. 2 illustrates an embodiment of an electric drive system 20 that can be used for practicing the method of the invention. This electric drive system 20 comprises a first energy storage 23 arranged upstream of a first inverter 25, and a second energy storage 24 arranged upstream of a second inverter 26. The electric drive system 20 further comprises an electric machine 27 having a first multiphase winding and operatively coupled to the first inverter 25 and at least one second multiphase winding coupled to the second inverter 26. The first energy storage means 23, the first inverter 25, and the first winding form a first powertrain 21. The second energy storage means 24, the second inverter 26 and the second winding form a second powertrain 22. However, both windings are arranged on the same stator within the electric machine 27. The electric drive system 20 further comprises a control circuit 28 coupled to control terminals of the two inverters 25, 26 and configured to regulate operation of the electric machine 27 according to the method of the invention. The functions described herein with respect to the control circuit 28 may be carried out through the use of dedicated hardware as well as hardware capable of executing software in association with appropriate software. In one embodiment, some or all of the functions may be performed by at least one processor, such as a computer or an electronic data processor, digital signal processor or embedded micro-controller, in accordance with code, such as computer program code, software, and/or integrated circuits that are coded to perform such functions. When provided by a processor, the functions of the control circuit 28 may be provided by a single dedicated processor, by a single shared processor, or by a plurality of individual processors, some of which may be shared. Moreover, the term "control circuit" should not be construed to refer exclusively to hardware capable of executing software, and may implicitly include, without limitation, digital signal processor (DSP) hardware, read only memory (ROM) for storing software, random access memory (RAM), and non-volatile storage. Other hardware, conventional and/or custom, may also be included in the control circuit 28, such as a memory, input/output interfaces, a wireless transceiver, analog-to-digital converters, etc In other words, generally during operation, regardless of the amount of power drawn by the electric machine 27, the first powertrain 21 is always active, so that the electric machine 27 is driven by providing a first flow of current between the first multiphase winding and the first energy storage means 23 and can perform mechanical work.

If, however, during operation of the electric machine 27, a load threshold via the first inverter 25 is exceeded based on only the first current flow, i.e., via the first powertrain 21, then the second inverter 26 also is activated, and the second powertrain 22 then is connected so that a second current flow between the second multiphase winding and the second energy storage means 24 is provided. As a result, in the event that high (motor or generator) loads are applied to the electric machine 27, both powertrains each provide a current flow for magnetic field formation in the electric machine 27 (motor operation), or a current generated by the electric machine 27 is stored in both energy storage means 23, 24 (recuperative operation).

The invention claimed is:

1. A method for operating an electric drive system (20) having: an electric machine (27), a first multiphase winding that is coupled operatively to a first inverter (25) and at least one second multiphase winding that is coupled to a second inverter (26), a first energy storage (23) arranged upstream of the first inverter (25), and a second energy storage (24) arranged upstream of the second inverter (26), the method comprising:

operating the electric machine (27) by providing a first power flow between the first energy storage (23) and the first multiphase winding; and energizing the second inverter (26) so that a second power flow can be provided between the second energy storage (24) and the second multiphase winding of the electric machine (27), wherein the second power flow is from the second power storage (24) to the second multiphase winding of the electric machine (27) only when a first load threshold for the first power flow across the first inverter (25) is exceeded, and wherein the second power flow is from the second multiphase winding of the electric machine (27) to the second ower storage (24) for charging of the second energy storage (24) when the second power storage (24) is not fully charged and in response to a specified steering angle signal or a specified braking signal.

2. The method of claim 1, further comprising:

disabling the second inverter (26) so that a current path carrying the second power flow is deactivated when a total power flow across the inverters (25, 26) during operation of the electric machine (27) falls below a second load threshold.

3. The method of claim 2, wherein disabling the second inverter (26) comprises a long-term opening of current conducting elements in the second inverter (26).

4. The method of claim 1, wherein the first load threshold applies to motor operation of the electric machine (27).

5. The method of claim 1, wherein each of the multiphase windings has a three-phase design.

6. The method of claim 1, wherein the first energy storage (23) comprises a different circuitry for energy storage cells arranged therein than the second energy storage (24).

7. An electric drive system (20), comprising:

an electric machine (27) having a first multiphase winding that is operatively coupled to a first inverter (25), and at least one second multiphase winding that is coupled to a second inverter (26), a first energy storage (23) that is arranged upstream of the first inverter (25); a second energy storage means (24) that is arranged upstream of the second inverter (26); and a control circuit (28) that includes control terminals of the first and second inverters (25, 26), the control circuit (28) being configured for:

operating the electric machine (27) by providing a first power flow between the first energy storage (23) and the first multiphase winding; and energizing the second inverter (26) so that a second power flow can be provided between the second energy storage (24) and the second multiphase winding of the electric machine (27), wherein the second power flow is from the second power storage (24) to the second multiphase winding of the electric machine (27) only when a first load threshold for the first power flow across the first inverter (25) is exceeded, and wherein the second power flow is from the second multiphase winding of the electric machine (27) to the second power storage (24) for charging of the second energy storage (24) when the second power storage (24) is not fully charged and in response to a specified steering angle signal or a specified braking signal.

* * * * *